Aug. 9, 1960 W. P. KOECHEL 2,948,258

SIGNAL DEVICE FOR TAPE RECORDERS

Filed July 30, 1958

INVENTOR
WALTER P. KOECHEL
BY
Eyre, Mann & Lucas
ATTORNEYS 2,948,258
Patented Aug. 9, 1960

2,948,258

SIGNAL DEVICE FOR TAPE RECORDERS

Walter P. Koechel, 117 73rd Ave.,
St. Petersburg Beach, Fla.

Filed July 30, 1958, Ser. No. 751,914
7 Claims. (Cl. 116—67)

The present invention relates to tape recorders and more particularly to an auxiliary device which signals to the user when the tape is about to run off the reel. The device is particularly adapted for use by the blind to prevent "talking off the tape" but can also be advantageously employed by sighted persons. The new signal device may be employed with reels of various diameter, is of simple construction and easy to operate. It can be arranged to give any desired type of audible signal, from a simple clicking noise to an electrically operated signal such as a buzzer or bell.

Briefly, the invention comprises a pivoted element or pawl which is so carried above the reel that the free end drops by gravity into the openings in the reel and onto the top of the tape during revolution of the reel. When only a predetermined number of turns of the tape are left on the reel, the end of the pivoted member drops through a larger arc to initiate a signal. In one form of the device a pin on the pawl strikes a fixed rod and gives a clicking sound which warns the operator that the tape is about to run off the reel. Preferably the spacing of the pawl from the axis of the reel is adjustable to accommodate the device for different sizes of reels or for different time intervals before tape depletion. Use of the device by blind people avoids the possibility of "talking off the tape" and, for the recipient, provides a warning that it is now time to turn over to track 2. By stopping before the end of the tape is reached, the labor to a blind person of rethreading the reels is avoided.

For a better understanding of the invention and of specific embodiments thereof reference may be had to the accompanying drawing of which:

Figures 2, 3, 3A, 4, 4A, 5, 6:
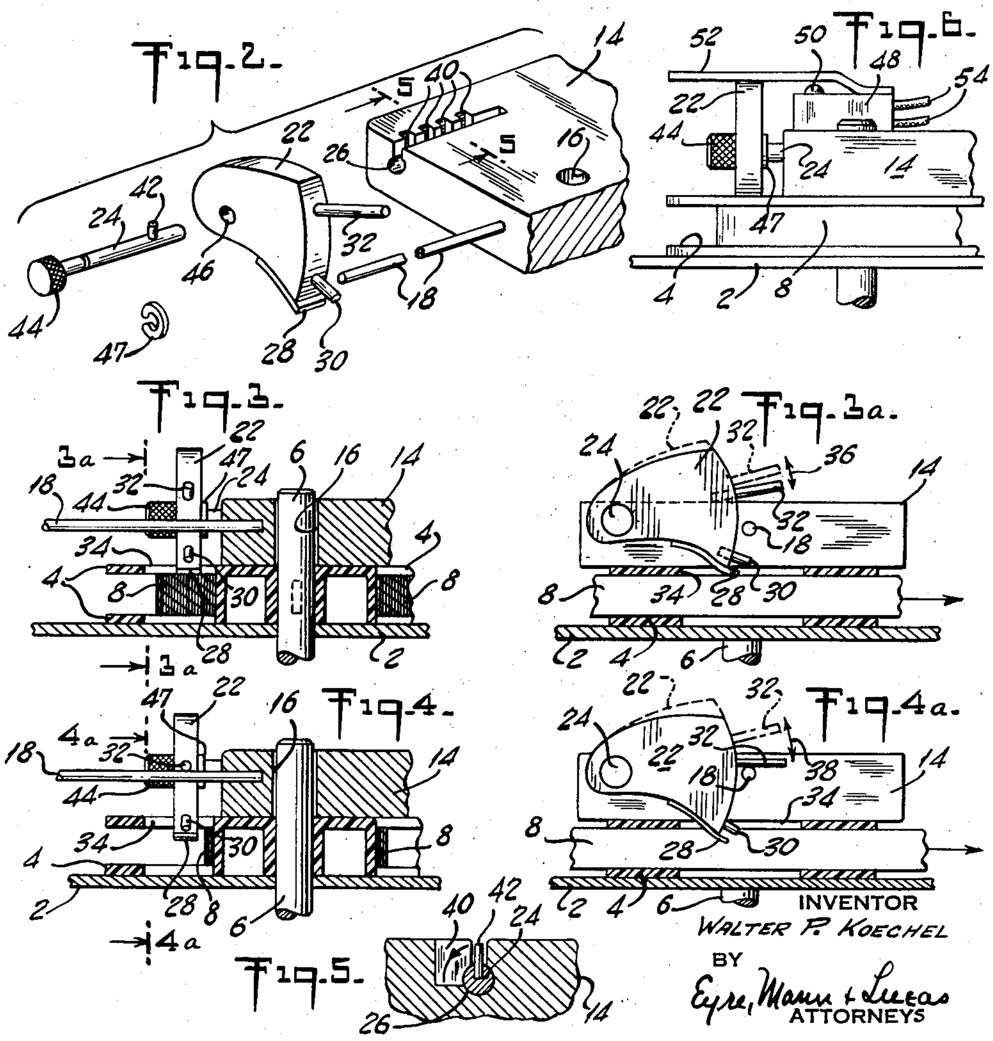
Fig. 2 is an exploded view of the signal device of Fig. 1.
Fig. 3 is a vertical sectional view taken on the line 3—3 of Fig. 1.

Fig. 3*a* is an end view taken on the line 3*a*—3*a* of Fig. 3;

Fig. 4 is a view similar to Fig. 3 but showing the position of the parts when the tape is about to run off the reel and the signal is being given;

Fig. 4*a* is an end view similar to Fig. 3*a* taken on the line 4*a*—4*a* of Fig. 4;

Fig. 5 is a detailed sectional view explanatory of the adjustment of the device for different size reels; and Fig. 6 is a side view representing a modification wherein an electrical signal is given.

Figure 1:
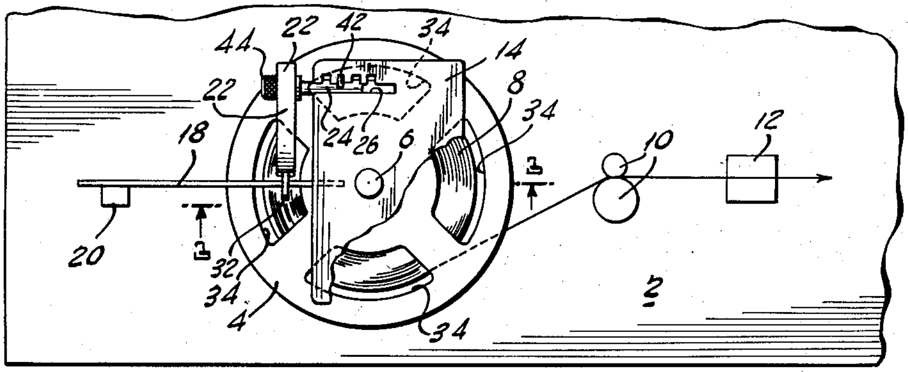
Fig. 1 is a partial plan view of a tape recorder provided with a signal device embodying the invention.

In Fig. 1 the platform of a tape recorder is indicated at 2 with a reel 4 mounted on a shaft 6, the tape 8 on the reel passing between rollers 10 to a recording or reproducing head diagrammatically indicated at 12. In accordance with the invention a block 14 of light weight material, for example wood, has a hole 16 for reception of the shaft 6 of the recorder, the block being freely mounted on the shaft so as not to be rotated thereby. A metal rod or pin 18 is fixed at one end in the block and extends laterally outwards to engage a stop 20 mounted on the platform 2. The pin 18 serves both to prevent rotation of the block 14 when the reel 4 rotates counterclockwise for delivery of the tape and also as one of the signal producing elements. Cooperating with the rod 18 is a pawl member 22, which is pivotally mounted on a shaft 24 one end of which extends into a channel 26 in the block 14. A strip of felt or foam rubber 28 is secured to the undersurface of the pawl 22 and a pair of pins 30 and 32 project from the generally arcuate end surface of the pawl, the pins spanning the rod 18 during operation of the device. The reel 4 has a plurality of arcuate openings 34 therein and the pawl 22 is so positioned on the shaft 24 that the free end of the pawl drops by gravity into the openings 34 as the reel rotates. When the supply of tape on the reel is such that the tape underlies the pawl, the extent of penetrations of the openings 34 by the pawl is limited by the tape, as shown in Figs. 3 and 3*a*, and the arc of movement of the pawl is determined by the difference between the upper surface of the reel and the upper surface of the tape. This arc is indicated by the arrow 36 of Fig. 3*a*. The strip 28 of rubber or felt deadens any sound which might be heard during the time the tape stops the pawl from falling through a greater arc. When most of the tape has been withdrawn from the reel so that it is not in position to be engaged by the pawl, the angle of movement of the pawl is increased to the angle indicated by the arrow 38 of Fig. 4*a*. The arc of travel of the pawl 22 is then limited by engagement of the pin 32 with the rod 18 and as these elements are of metal a clicking noise occurs which signals to the operator that there is but few turns of tape remaining on the reel.

In the particular embodiment of the invention illustrated in Figs. 1 through 5, means are provided for adjusting the spacing of the pawl 22 from the axis of the reel. These means comprise a plurality of recesses 40 offset from the channel 26 in the block 14 each of which is adapted to receive a nub 42 on the shaft 24. The shaft 24 has a knurled head 44 threaded to its outer end. In assembling the device, the shaft 24 is inserted into the bore 46 of the pawl and the pawl brought flush with the head 44. A C-ring 47 is then slipped over the shaft and brought flush against the pawl. The nub 42 is then threaded into the shaft. The shaft 24 is then inserted into the channel 26 and thereafter turned counterclockwise, as indicated in Fig. 5, to bring the nub 42 into any desired one of the recesses 40. Pin 30 by engagement with the undersurface of rod 18 insures against inadvertent excess counterclockwise rotation of the pawl during assembly. The block 14 with the parts attached thereto is then placed over the shaft 6 of the recorder. If desired suitable raised indicia could be provided adjacent the recesses 40 to aid a blind man in selecting the correct recess for any desired spacing of the pawl from the axis of the reel.

Instead of using the repeated impact of pin 32 with rod 18 as an audible signal, the movement of the pawl could actuate a microswitch or the like to close the circuit of an electrically energized signal. In Fig. 6 such an arrangement is diagrammatically indicated. In that figure a microswitch is indicated at 48 with an actuating element 50. A leaf spring 52 rests against the pawl 22 and is thereby prevented from actuating the switch except when the arcuate movement of the pawl increases due to near depletion of the tape. Any suitable signalling device may be connected to the leads 54 of the microswitch so as to be energized when the actuating element 50 is depressed by the spring 52.

The invention has now been described with particular reference to the recording of a message on the tape. Obviously the same device may be employed during reproduction as it is immaterial whether the head 12 of Fig. 1 is a recording or a reproducing head.

Various changes in the particular construction illustrated could be made without departing from the spirit of the invention or the scope of the accompanying claims. For example, if continuous, rather than step-by-step adjustment is desired the shaft 24 could be threadedly mounted in the block 14 in which case adjustment of the spacing of the pawl from the axis of the reel would be effected by rotation of the shaft, the length of shaft protruding from either side of the block being then an indicator to the user of the particular setting. Also, a separate stop for the rod 18, such as the stop 20 would not ordinarily be necessary as any fixed part of the recorder, such as the housing cover, could serve the purpose of the stop 20.

Also, instead of operating a microswitch for closure of an electric circuit, as in the embodiment of Fig. 6, movement of the pawl could operate the tripping mechanism of a music box or similar type spring actuated device.

In the particular embodiment of the invention illustrated unwinding of the tape from the reel 4 is effected by counterclockwise rotation. In recorders where unwinding is effected by clockwise rotation of a reel, obviously the position of the pawl would be reversed to accommodate such direction of rotation. Other variations will occur to those skilled in the art.

Although the invention as previously indicated is particularly suited for use by the blind the invention is not necessarily limited to such use as will be readily apparent.

The following is claimed:

1. The combination with a tape recorder and reproducer having a reel which rotates about a vertical axis during withdrawal of tape therefrom, the reel comprising two discs having arcuate apertures therein and an intermediate hub portion between the discs and about which the tape is wound, of a device for signaling near depletion of the tape on the reel which comprises a member supported by the upper reel disc with a portion thereof maintained in alignment with the axis of rotation of the reel, means holding said member against rotation with the reel, a horizontal shaft mounted in said member and extending over the arcuate apertures in the upper reel disc, an element pivotally mounted at one end on said shaft and having a free end positioned to drop by gravity into successive apertures in the reel disc during rotation of the reel, the extent of movement of the free end of the element being limited by engagement with the tape when more than a predetermined number of turns of tape remain on the reel, and means responsive to increase in depth of penetration of the apertures by the free end of the element due to near depletion of the tape, for producing an audible signal.

2. The combination according to claim 1 wherein said last mentioned means comprise a pin carried by the free end of said element and a rod extending horizontally from said member at a level to be engaged by said pin when the depth of penetration of an aperture by the free end of the element increases whereby engagement of the pin with the rod gives an audible click as each aperture of the reel comes under the free end of the element during rotation of the reel, said rod forming part of said means for holding said member against rotation by the reel.

3. The combination according to claim 1 wherein the undersurface of the free end of said element is provided with a layer of sound deadening material positioned for engagement with the reel and the tape on the reel to prevent audible interference during recording or reproducing.

4. The combination according to claim 1 including means for adjusting the spacing between the free end of said element and the axis of rotation of the reel, to accommodate the signalling device to reels of different dimensions and to permit adjustment of the time before run-out of the tape that the signal is given.

5. The combination according to claim 1 wherein said last mentioned means includes a microswitch and means for actuating the same, said last mentioned means being coupled to said element for actuation of the microswitch upon predetermined angular movement of the free end of the element.

6. The combination with a tape recorder and reproducer having a reel which rotates about a vertical axis during withdrawal of tape therefrom, the reel comprising two discs having arcuate apertures therein and an intermediate hub portion between the discs and about which the tape is wound, of a device for giving an audible signal a predetermined number of minutes before the tape runs off the reel, said device comprising a block supported by the reel and having a vertical hole therein for alignment with the axis of the reel and a horizontal passage therein, a shaft mounted in said horizontal passage with an end extending over the apertures of a reel disc, a pawl element pivotally mounted near one end thereof on said shaft and having a generally arcuate surface at its other end, a pin extending from said arcuate surface, a horizontally disposed rod mounted at one end in said block and positioned for engagement by said pin only when the free end of the pawl enters an aperture in the reel disc and its downward movement is not limited by engagement with the tape, whereby, when the radius of the outer winding of the remaining tape on the reel is less than the spacing between the pawl and the vertical axis of the reel an audible click is given as the pin engages the rod each time an aperture of the reel disc comes under the pawl during rotation of the reel.

7. The combination according to claim 6 including means for adjusting the spacing between the pawl and the axis of rotation of the reel to adjust the device for reels of different diameter, or to cause the audible signal to be given at a different number of minutes before depletion of the tape.

References Cited in the file of this patent

UNITED STATES PATENTS

| | | |
|---|---|---|
| 1,078,861 | Koch | Nov. 18, 1913 |
| 1,803,241 | Finkel | Apr. 28, 1931 |
| 1,841,748 | Marks | Jan. 19, 1932 |
| 2,420,832 | Merkur | May 20, 1947 |
| 2,493,340 | Cohen | Jan. 3, 1950 |